No. 636,184. Patented Oct. 31, 1899.
A. F. A. ROXENDORFF.
AUTOMATIC VARIABLE DRIVING GEAR FOR VELOCIPEDES.
(Application filed Nov. 9, 1898.)
(No Model.) 2 Sheets—Sheet 1.
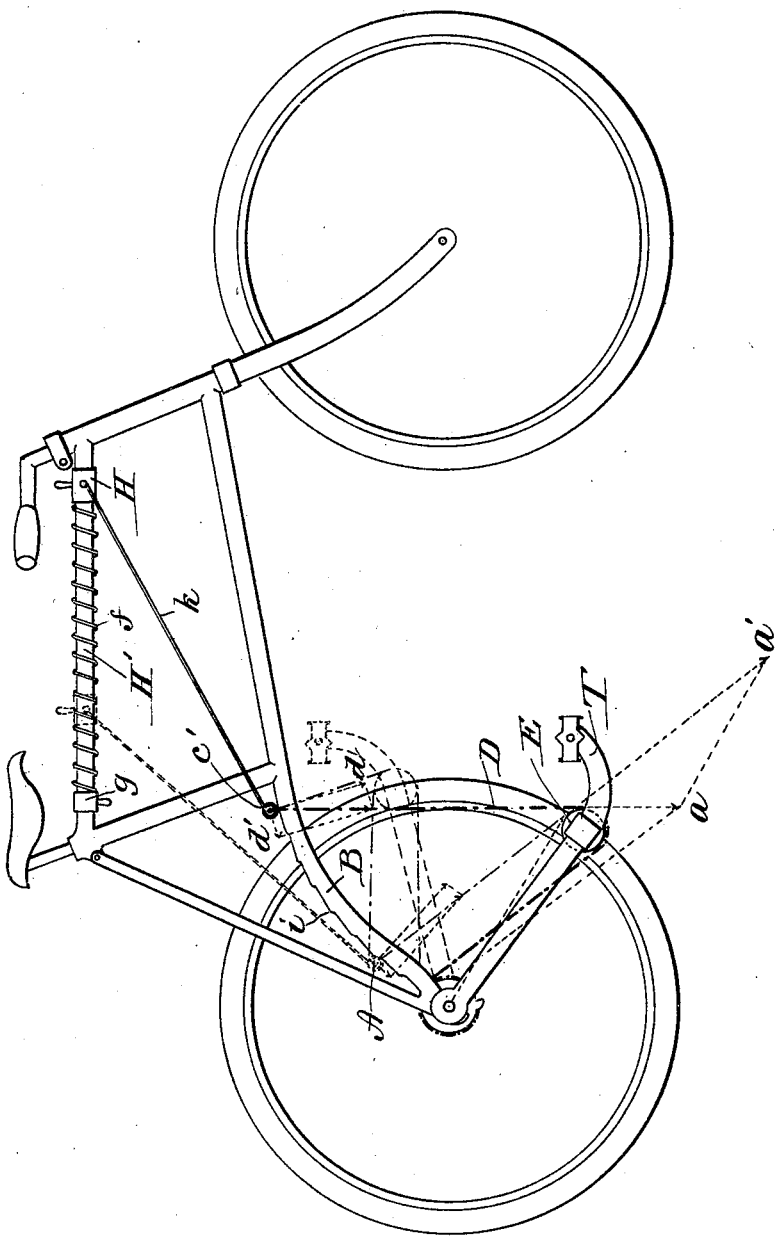

No. 636,184. Patented Oct. 31, 1899.
A. F. A. ROXENDORFF.
AUTOMATIC VARIABLE DRIVING GEAR FOR VELOCIPEDES.
(Application filed Nov. 9, 1898.)
(No Model.) 2 Sheets—Sheet 2.
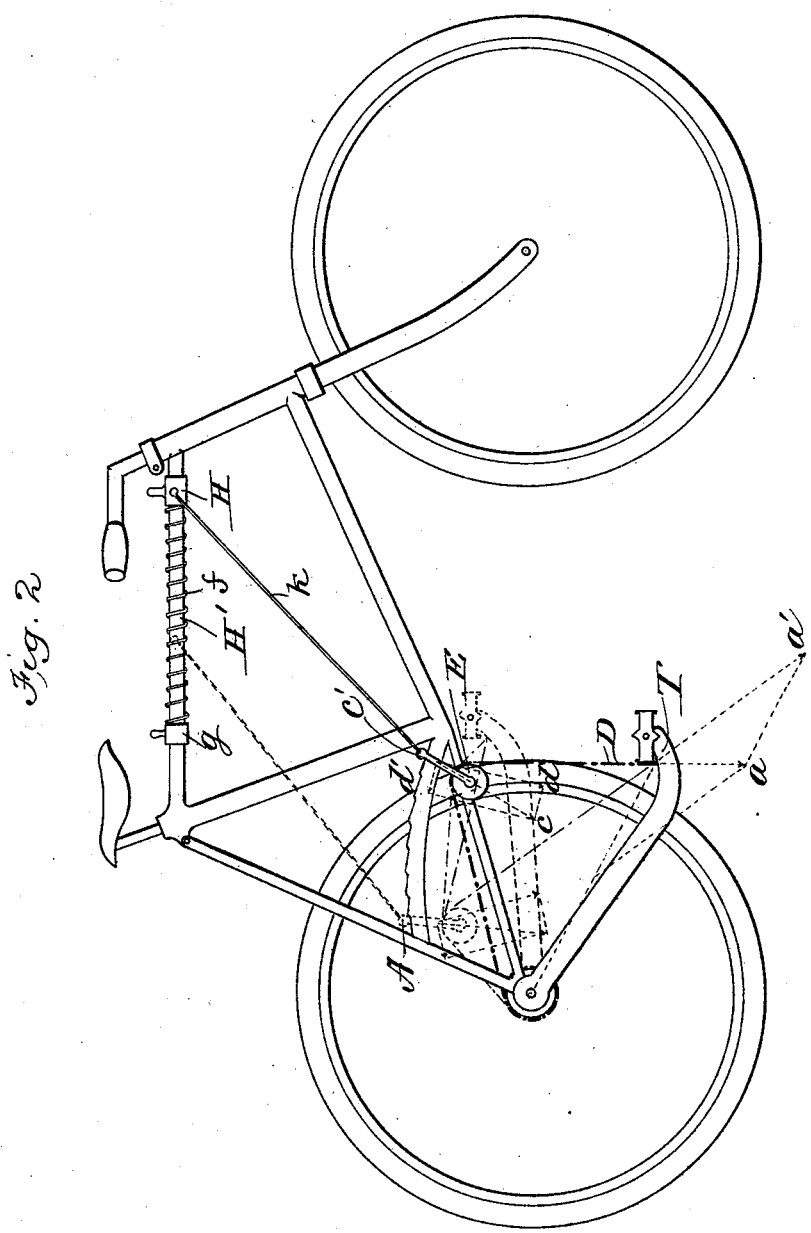

United States Patent Office.

AXEL FREDRIK ABRAHAMSON ROXENDORFF, OF STOCKHOLM, SWEDEN.

AUTOMATIC VARIABLE DRIVING-GEAR FOR VELOCIPEDES.

SPECIFICATION forming part of Letters Patent No. 636,184, dated October 31, 1899.

Application filed November 9, 1898. Serial No. 695,960. (No model.)

*To all whom it may concern:*

Be it known that I, AXEL FREDRIK ABRAHAMSON ROXENDORFF, engineer, a subject of the King of Sweden and Norway, residing at Stockholm, in the Kingdom of Sweden, have invented new and useful Improvements in Automatic Variable Driving-Gear for Velocipedes, of which the following is a specification.

For the propulsion of a velocipede a greater or less expenditure of power is required according to the inclination or condition of the road. The machine therefore is occasionally provided with a variable driving-gearing in order that when the machine runs easy the treadle motion may be worked with great velocity ratio, so as to make the speed quicker, while when the machine runs heavily a reduced velocity ratio may be used. The change of the gearing has heretofore been effected by hand.

The present invention is based on the principle that when the machine runs heavily—as, for instance, in traveling on a bad road or up a grade—a greater pressure is exerted on the treadles by the rider than when the machine runs easily. The driving arrangement consists of oscillating treadles, drive-chains, and ratchet-couplings.

Figure 1 is a side elevation of a bicycle constructed in accordance with my invention. Fig. 2 is a similar view of a modified construction.

From the treadle T, Fig. 1, the chain D, as in my application, Serial No. 663,385, passes over the pulley E, mounted on the treadle, up to a sliding piece $C'$, adapted to be moved along a guide B, formed by one of the lower braces of the frame, said guide being shaped as an involute of a circle and provided with notches $i$ for retaining the sliding piece in a position corresponding to the pressure on the treadles, as will be more fully explained below. There are two treadles (marked F) employed, one on each side of the bicycle, and the chains D, connected therewith, have their rear ends connected with clutch members G, secured to the wheel-hub at opposite sides of the wheel. When the treadle is depressed, a tension is produced in the chain D, which tension is the resultant of one force $d$, perpendicular or radial to the guide B, and one force $d'$, directed tangentially with reference to the said guide.

When the treadle is in the upper portion of its stroke and the sliding piece is in its forward position, this tangential force $d'$ is equal to zero, since the chain is here perpendicular to the guide. As the angularity of the chain becomes greater in the downstroke, the said force increases. The sliding piece $C'$ is connected to the rod $k$, which is attached to a collar H, that can be shifted by the said rod on the frame-tube $H'$. Around the tube $H'$ a spiral spring $f$ is located, which by bearing against an adjustable abutment or collar $g$ strives to push the collar H forward, together with the sliding piece $C'$, thus counteracting the force $d'$. When the pressure on the treadle is increased—for instance, in traveling up a grade of the road—the force $a$, acting on the treadle, is increased, and consequently the force $d'$ as well, which overcomes the resistance of the spring $f$, this action taking place in the lower portion of the stroke of the treadle. The sliding piece is consequently moved rearward—for instance, into the position A—until equilibrium is reached, the tension in the chain D being thus increased from $a$ to $a'$. Thus with increasing resistance an increase of the force exerted and automatical decrease of the velocity ratio of the gearing takes place. As, however, on the subsequent raising of the treadle the pressure bearing on it is reduced to a considerable extent, the sliding piece would travel repeatedly back and forth on the guide were it not for the introduction of the notches $i$, above referred to, on the guide, said notches consequently in the rear positions of the sliding piece preventing the return of the sliding piece by the spring. On the other hand, when the resistance has become smaller—i. e., when the rider is traveling on a smooth road or down an incline—the pressure in the treadle is relieved by the rider to such an extent that the power of the spring will be sufficient to return the sliding piece to its position for increased velocity ratio of the gearing in spite of the presence of the aforesaid notches. The latter evidently must be so shaped or rounded off that their resistance to the motion of the sliding piece on the guide will be gaged to suit the power of the spring and the degree of sensitiveness required of the gear. While one treadle is ascending the other is descending, so that the pressure on the slide is constant, whereby the said slide is held in the notches until the pressure on the treadles is relieved to such an extent that the tension of the spring will force the slide out of the notch.

By moving the abutment $g$ so as to increase or decrease the tension of the spring the driving-gearing may be adjusted to suit higher or lower stages of power development, the abutment $g$ being for this purpose provided with some suitable arrangement for fixing it in position. Both collars H and $g$ are made so as to be easily reached by the rider.

Fig. 2 shows a modified construction where the end of the chain is attached to the treadle and the pulley is made to slide along the arc B and is connected by means of the rod $k$ with the collar H, which can be shifted on the frame-tube H' by the spring $f$ acting to push it forward and bearing against an adjustable abutment $g$, as before described. When the treadle is depressed, a tension is produced in each part of the chain D, the resultant of which tensions, approximately bisecting the angle formed between the parts of the chain running over the pulley, is designated by $c$ and in its turn may be resolved into one force $d$ radial to the guide B and one force $d'$ tangential to the same guide. The force $d'$ is counteracted by the spring $f$ through the intermediate rod $k$; but if the pressure on the treadle increases so as to overcome the elasticity of the spring $f$ the pulley E will be moved rearward—for instance, into the position A—there being thus produced in the chain D a force $a'$ greater than the force $a$, which denotes the tension before the compression of the spring. The guide B is given such a shape that the pulley E will slide rearward as the pressure on the treadles increases. The action of the notches of the guide will evidently be identical with that in the arrangement previously described.

I claim—

1. In a velocipede, the combination with the frame, the curved guide, the slide carried by said guide and the coiled spring and connection therewith and with the slide, of the driving-wheel, the clutch members, the oscillating treadles and the chains connected with said clutch members, treadles and slide, and the said slide so located with respect to the treadles that when the latter are depressed with a force sufficient to overcome the tension of the spring, the slide will be moved toward the axis of the driving-wheel and held in such position until the pressure on the treadles is reduced when the spring will restore the slide to normal position, substantially as described.

2. In a velocipede, the combination with the frame, the curved guide, the slide carried by said guide and the coiled spring and the rod connecting said slide and spring, of the driving-wheel, the clutch members, the oscillating treadles provided with pulleys, the chains passing therearound and secured to said clutch members and slide respectively, and said slide so located with respect to the treadles that when the latter are depressed with a force sufficient to overcome the tension of the spring, the slide will be moved toward the axis of the driving-wheel and held in such position until the pressure on the treadles is reduced when the spring will restore the slide to normal position, substantially as described.

3. In a velocipede, the combination with the frame, the driving-wheel provided with clutch members, the curved guide formed with notches and the slide carried by said guide and adapted to engage with said notches, of the oscillatory treadles, the pulleys carried thereby, the chains passing therearound and connected with said clutch members and slide, respectively, the coiled spring and the rod connected therewith and with said guide so located with respect to the treadles that when the latter are depressed with a force sufficient to overcome the tension of the spring, the slide will be moved toward the axis of the driving-wheel so as to engage with one of said notches and be held in engagement therewith by the increased force exerted upon the treadles, substantially as described.

In testimony whereof I have hereunto set my hand in presence of two subscribing witnesses.

AXEL FREDRIK ABRAHAMSON ROXENDORFF.

Witnesses:
J. MAHNGREN,
S. ALAHNGRERY.